United States Patent
Mosby

[15] 3,691,201
[45] Sept. 12, 1972

[54] CYANOIMINO-DITHIOLE-DICARBOXYLIC ESTERS

[72] Inventor: William Lindsay Mosby, North Plainfield, N.J. 07060

[73] Assignee: American Cyanamid Company, Stamford, Conn.

[22] Filed: May 13, 1970

[21] Appl. No.: 37,048

[52] U.S. Cl............260/327 M, 260/464, 260/485 M, 424/277, 71/90
[51] Int. Cl..........................C07d 71/00, A61k 27/00
[58] Field of Search..................................260/327 M

[56] References Cited

UNITED STATES PATENTS 3,424,764   1/1969   Mosby......................260/327

Primary Examiner—Henry R. Jiles
Assistant Examiner—Cecilia M. Shurko
Attorney—John M. Miele

[57] ABSTRACT

Novel lower alkyl 2-cyanoimino-1,3-dithiole-4,5-dicarboxylic acid esters are provided which are useful biocides, such as bactericides, fungicides or herbicides and have the following general formula:

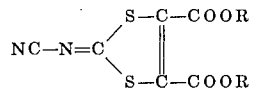

wherein R represents an alkyl group of from one to five carbon atoms.

3 Claims, No Drawings

CYANOIMINO-DITHIOLE-DICARBOXYLIC ESTERS

Generally stated, the subject matter of the present invention relates to a new class of heterocyclic compounds and to a process for their preparation. In addition, this invention relates to bactericidal and fungicidal compositions as well as to a method for controlling undesirable plant life.

More particularly, this invention relates to a new class of 1,3-dithiole derivatives. Still more particularly, the compounds of the present invention are all directed to substituted 2-cyanoimino-4,5-dicarboxylic esters of 1,3-dithioles of the formula:

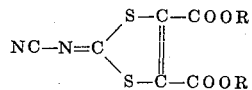

wherein R is an alkyl group of from one to five carbon atoms.

The compounds of the present invention are biocidal in nature. More particularly they demonstrate herbicidal activity towards a variety of plants. Compositions containing these compounds have been found to be effective as postemergence herbicides.

In addition, the substituted 2-cyanoimino-1,3-dithiole-4,5-dicarboxylic esters herein described possess useful antibacterial activity. Furthermore, these compounds are also effective against a large number of fungi which are saprophytic in nature and cause physical decay, which result in the spoilage of foods, and which are pathogenic to plants and animals.

In general, the compounds of this invention are pale yellow, low-melting solids which are insoluble in water and soluble in organic solvents such as benzene, dimethylformamide and alcohol.

Typical compounds prepared by the process of the present invention include: dimethyl 2-cyanoimino-1,3-dithiole-4,5-dicarboxylate, diethyl 2-cyanoimino-1,3-dithiole-4,5-dicarboxylate, di-n-propyl 2-cyanoimino-1,3-dithiole-4,5-dicarboxylate, di-n-butyl 2-cyanoimino-1,3-dithiole-4,5-dicarboxylate, ditert.-butyl 2-cyanoimino-1,3-dithiole-4,5-dicarboxylate, di-n-amyl 2-cyanoimino-1,3-dithiole-4,5-dicarboxylate and di-sec-amyl 2-cyanoimino-1,3-dithiole-4,5-dicarboxylate.

These compounds can be prepared by reacting at least equimolecular proportions of a di(alkali metal)cyanodithioimidocarbonate and a dialkyl 2,3-dihalomaleate is an appropriate solvent. This reaction can be represented as follows:

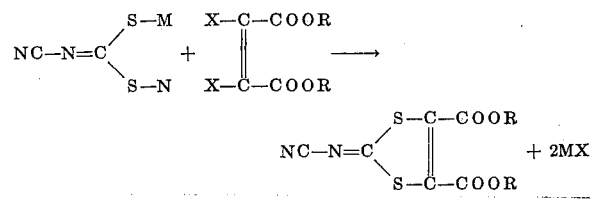

wherein M is an alkali metal, such as sodium and potassium, X is a halogen, such as chloro and bromo, and R is a lower alkyl group of from one to five carbon atoms.

In general, the reaction is carried out in a solvent which is inert with respect to both starting materials and the final product. Dimethylformamide is considered to be the solvent of choice.

Approximately equimolecular amounts of the reactants are used, although it may be advantageous to use an excess of the cyanodithioimidocarbonate salt to assure completion of the reaction. The reaction proceeds smoothly at ambient temperatures and within a reasonable period of time of from several minutes to about an hour. If desired, temperatures above ambient temperatures may be employed to facilitate completion of the reaction. The use of temperatures below ambient temperature may also be conveniently employed to control the rate of the reaction—an increase in temperature resulting in an increased rate of reaction, whereas a decrease in temperature causes the reaction to proceed much more slowly at a controlled rate.

Illustrative of the di(alkali metal)cyanodithioimidocarbonate compounds useful as starting materials are: disodium cyanodithioimidocarbonate and dipotassium cyanodithioimidocarbonate. These salts are prepared by reacting calcium cyanamide and carbon disulfide for several hours at temperatures of from about 40° to 45°C. to form the calcium salt of cyanodithioimidocarbonic acid. The calcium salt so produced is further treated with sodium carbonate to yield disodium cyanodithioimidocarbonate. Typical reaction conditions for preparing these salts are described with greater specificity in U.S. Pat. No. 2,816,136.

Examples of dialkyl 2,3-dihalomaleates useful as starting materials are: dimethyl 2,3-dichloromaleate, dimethyl 2,3-dibromomaleate, diethyl 2,3-dichloromaleate, di-n-propyl 2,3-dichloromaleate, diisobutyl 2,3-dichloromaleate, etc. The preferred halogen substituents are bromine and chlorine.

These esters are prepared by condensing the appropriate dihalomaleic anhydride with the corresponding alcohol. For instance, dichloromaleic anhydride can be refluxed with methyl alcohol in a solvent such as toluene to prepare the compound dimethyl dichloromaleate. Similarly, if ethyl alcohol is substituted for methyl alcohol the corresponding diethyl dichloromaleate is obtained. Specific reaction conditions for the preparation of di-lower alkyl 2,3-dichloromaleate esters are described with more particularity in U.S. Pat. No. 2,802,803.

Another object of the present invention is the preparation of compositions which can be formulated as emulsifiable liquid concentrates useful as herbicides in controlling undesirable plants. These compositions may be beneficially employed in areas to suppress unwanted vegetation, as for example, along railroad tracks, industrial sites, and gas and oil tank farms.

Liquid compositions may be prepared by dissolving the compounds prepared in accordance with the present invention in a variety of organic solvents. The resulting solutions are subsequently admixed with water, either with or without an emulsifying agent. Exemplary of organic solvents which may be so employed are: acetone, methyl isobutyl ketone, dioxane, isopropyl acetate, ethanol, benzene, xylene, dimethyl sulfoxide, dimethylformamide, the nitroparaffines, cyclohexanone, aromatic naphthas or their equivalents.

Surface active agents or emulsifiers which can be employed are those normally employed in the preparation of oil-in-water emulsions. They may be either ionic or non-ionic in nature. Representative of such emulsifiers used are: the higher alkylaryl sulfonates, polyoxyethylene esters, polyglycol ethers, and sodium dioctyl sulfosuccinate. The emulsifying agents are employed in low concentrations, generally in the range of from about 0.1 percent to about 2 percent by weight of the total weight of sprayable emulsion.

The compounds of the present invention also lend themselves to the formulation of herbicidal dusts, granules and wettable powders. These formulations are readily prepared by blending the desired compound to be employed with a solid carrier. Alternatively, the compound may be dissolved in a suitable solvent and added to the carrier in the form of a spray or solution by any of the conventional and well recognized procedures. Illustrative of the solid carriers which may be employed are: talc, clays, pumice, walnut shell flour, chalk, diatomaceous earth, and vermiculite. Small amounts of emulsifiers or wetting agents may also be added to such formulations to assist their uniorm dispersability onto the carrier.

The amount of 2-cyanoimino-1,3-dithiole-4,5-dicarboxylic ester employed in such herbicidal compositions as described will vary both in the manner and for the purpose for which the composition is to be employed. Concentrated spray solutions may contain as much as 90 percent or more by weight of the active ingredient. Sprays, dusts, or wettable powders for direct application to vegetation will be much more dilute, e.g., the active ingredient is present in a concentration of from 0.2 percent to as high as 10 percent by weight.

The following examples are provided for illustrative purposes etc. Unless otherwise noted, all parts are by weight.

EXAMPLE 1

A mixture of 2.0 parts dipotassium cyanodithioimidocarbonate and 6.4 parts dimethyl 2,3-dichloromaleate in 3 parts, by volume, of dimethylformamide is triturated at ambient temperature for several minutes until a clear solution is obtained. Upon the addition of water an oily precipitate is obtained which on standing becomes crystalline. The crystals are separated, washed with water, methanol and finally with ligroin. Upon drying and recrystallization from benzene, dimethyl 2-cyanoimino-1,3-dithiole-4,5-dicarboxylate is obtained as a pale yellow product which melts at 87°–89°C.

EXAMPLE 2

Repeating the procedure of Example 1 but substituting an equivalent amount of dimethyl 2,3-dibromomaleate for the dimethyl 2,3-dichloromaleate results in the formation of dimethyl 2-cyanoimino-1,3-dithiole-4,5-dicarboxylate.

EXAMPLE 3

In like manner, the procedure of Example 1 is repeated this time utilizing an equivalent amount of disodium cyanodithioimidocarbonate in lieu of the dipotassium salt. Dimethyl 2-cyanoimino-1,3-dithiole-4,5-dicarboxylate is obtained in good yield.

EXAMPLE 4

When diethyl 2,3-dichloromaleate is substituted for the corresponding dimethyl 2,3-dichloromaleate of Example 1, a pale yellow oily precipitate, diethyl 2-cyanoimino-1,3-dithiole-4,5-dicarboxylate, is obtained.

EXAMPLE 5

The anitfungal and antibacterial activities of the product of Example 1 are measured by a standard microbiological assay procedure, i.e., by a standard agar dilution method. Standard sterile nutrient agar solutions containing different dilutions of a solution containing 2.5 mg. of test compound per millimeter of solution are allowed to cool in a petri dish, thereby forming solidified agar plates. Suitable control solutions are also employed. Suspension of the test organisms are streaked on the agar plates and the plates are incubated. The plates are examined and the minimal concentration of the test compound causing complete inhibition of microbial growth is noted.

The results are shown in the table below.

TABLE I

| Fungi | Minimal Inhibitory Concentration |
|---|---|
|  | mcg./ml. |
| Candida albicans | 250 |
| Candida mycoderma | 250 |
| Saccharomyces cerevisiae | 125 |
| Mucor ramanniamus | 62 |
| Fusarium spisphaeria | 62 |
| Hormodendrum cladosporioides | 125 |
| Trichophyton mentagrophytes | 8 |
| Microsporum gypseum | 15 |
| Penicillium digitatum | 62 |
| Memnoniella echinata | 62 |
| Chaetomium globosum | 31 |
| Aspergillus fumigatus | 62 |
| Bacteria |  |
| Mycobacterium smegmatis | 125 |
| Clostridium sporogenes | 125 |

EXAMPLE 6

A herbidical dust is prepared by dissolving 1 part of dimethyl 2-cyanoimino-1,3-dithiole-4,5-dicarboxylate in 20 parts of an aqueous 50 percent methyl isobutyl ketone solution. Five parts of this solution are added to 25 parts of ground walnut shell flour, the mixture blended and dried. The resulting herbidical composition is useful as a dust for direct application to the leaves of unwanted plants or to the locus to be protected from undesirable plant growth.

EXAMPLE 7

A liquid concentrate is prepared by dissolving 1 part of diethyl 2-cyanoimino-1,3-dithiole-4,5-dicarboxylate in 10 parts of dimethylformamide. To this is added 0.1 part of sodium dioctyl sulfosuccinate as an emulsifying agent. A mixture of one part of this concentrate in 20 parts of water is found to be an effective herbicidal solution when employed as a spray on the leaves of such undesirable plants as crabgrass, pigweed and barnyard grass.

EXAMPLE 8

The post-emergence herbicidal effectiveness of dimethyl 2-cyanoimino-1,3-dithiole-4,5-dicarboxylate is measured by preparing various concentrations of the compound in a 50 percent aqueousacetone solution. The active compound is applied as a spray to a variety of species of 2 week old plants in a sufficient quantity so as to provide the equivalent of about 10 pounds per acre of the active herbidical compound. The treated plants are then placed on greenhouse benches, and the results are observed and recorded 2 weeks after treatment. Lambs-quarter, pigweed, barnyard grass and crabgrass show a complete kill. Plants such as mustard, tomato and radish are injured showing the herbitoxic effect of the compound on these plants.

What is claimed:

1. A compound of the formula:

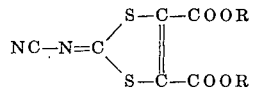

wherein R is a lower alkyl group of from one to five carbon atoms.

2. The compound according to claim 1, dimethyl 2-cyanoimino-1,3-dithiole-4,5-dicarboxylate.

3. The compound according to claim 1, diethyl 2-cyanoimino-1,3-dithiole-4,5-dicarboxylate.